US010867622B2

United States Patent
Yelchuru et al.

(10) Patent No.: US 10,867,622 B2
(45) Date of Patent: Dec. 15, 2020

(54) MONITORING INDUSTRIAL EQUIPMENT USING AUDIO

(71) Applicant: Honeywell International Inc., Morris Plains, NJ (US)

(72) Inventors: Ramprasad Yelchuru, Bangalore (IN); Shreyan Chowdhury, Bangalore (IN); Pradyumna Sampath, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/664,114

(22) Filed: Oct. 25, 2019

(65) Prior Publication Data
US 2020/0066298 A1 Feb. 27, 2020

Related U.S. Application Data

(63) Continuation of application No. 16/033,883, filed on Jul. 12, 2018, now Pat. No. 10,475,468.

(51) Int. Cl.
*G10L 25/51* (2013.01)
*F24F 11/30* (2018.01)

(52) U.S. Cl.
CPC .............. *G10L 25/51* (2013.01); *F24F 11/30* (2018.01)

(58) Field of Classification Search
USPC ..... 381/56, 58, 61; 379/14.01, 15.05, 22.03, 379/29.07, 29.08
See application file for complete search history.

(56) References Cited

U.S. PATENT DOCUMENTS 6,775,642 B2 8/2004 Remboski et al.
7,742,641 B2 * 6/2010 Ivanov ................ G06K 9/6293
382/190

(Continued)

FOREIGN PATENT DOCUMENTS

CN 103366738 B 8/2016
CN 205620145 U 10/2016

(Continued)

OTHER PUBLICATIONS

Saimurugan, et al., "Intelligent Fault Diagnosis Model for Rotating Machinery Based on Fusion of Sound Signal", International Journal of Prognostics and Health Management, 2016, 10 pages.

(Continued)

*Primary Examiner* — Yosef K Laekemariam
(74) *Attorney, Agent, or Firm* — Seager Tufte & Wickhem LLP

(57) ABSTRACT

Systems, methods, and devices for monitoring industrial equipment using audio are described herein. One system includes two computing devices. The first computing device can receive, from an audio sensor, audio sensed during operation of industrial equipment, extract a plurality of features from the audio, determine whether any portion of the audio is anomalous, and send, upon determining a portion of the audio is anomalous, the anomalous portion of the audio to the second, remotely located, computing device. The second computing device can provide the anomalous portion of the audio to a user to determine whether the anomalous portion of the audio corresponds to a fault occurring in the equipment, and receive, from the user upon determining the anomalous portion of the audio corresponds to a fault occurring in the equipment, input indicating the anomalous portion of the audio corresponds to the fault to learn fault patterns in the equipment.

15 Claims, 4 Drawing Sheets

(56) References Cited

U.S. PATENT DOCUMENTS

| | | |
|---|---|---|
| 8,643,539 B2 | 2/2014 | Pauly et al. |
| 8,938,404 B2 | 1/2015 | Cabman et al. |
| 9,244,042 B2 | 1/2016 | Rank |
| 9,658,100 B2 | 5/2017 | Park |
| 2002/0172373 A1 | 11/2002 | Boss |
| 2003/0196492 A1 | 10/2003 | Remboski et al. |
| 2005/0004797 A1 | 1/2005 | Azencott |
| 2016/0091398 A1 | 3/2016 | Pluemer |
| 2016/0327522 A1* | 11/2016 | Tanaka ................. G01N 29/14 |
| 2016/0330062 A1 | 11/2016 | Alloin et al. |
| 2018/0040222 A1 | 2/2018 | Findlay et al. |
| 2018/0157386 A1* | 6/2018 | Su ........................... G06F 9/451 |
| 2019/0089656 A1* | 3/2019 | Johnson, Jr. ............ G06F 40/35 |

FOREIGN PATENT DOCUMENTS

| | | |
|---|---|---|
| EP | 1850325 A1 | 10/2007 |
| EP | 2538034 A2 | 12/2012 |
| EP | 3193317 A1 | 7/2017 |
| WO | 2004029743 A1 | 4/2004 |

OTHER PUBLICATIONS

Pan, et al., "Cognitive Acoustic Analytics Service for Internet of Things", 2017 IEEE International Conference on Cognitive Computing (ICCC), Jun. 25-30, 2017, 8 pages.

Scardapane, et al., "Microphone array based classification for security monitoring in unstructured environments", AEU—International Journal of Electronics and Communications, vol. 69, Issue 11, Nov. 2015, 9 pages.

Scardapane, et al., "On acoustic surveillance of hazardous situations", 2009 IEEE International Conference on Acoustics, Speech and Signal Processing, Apr. 19-24, 2009, 5 pages.

Maijala, et al., "Environmental noise monitoring using source classification in sensors", Applied Acoustics, vol. 129, Jan. 2018, 10 pages.

PCT/US2019/041990, International Search Report and Written Opinion, pp. 14, dated Sep. 23, 2019.

* cited by examiner

MONITORING INDUSTRIAL EQUIPMENT USING AUDIO

The present application is a continuation of U.S. application Ser. No. 16/033,883, filed Jul. 12, 2018, entitled, "MONITORING INDUSTRIAL EQUIPMENT USING AUDIO," which is hereby incorporated by reference.

TECHNICAL FIELD

The present disclosure relates generally to systems, methods, and devices for monitoring industrial equipment using audio.

BACKGROUND

A heating, ventilation, and air conditioning (HVAC) system can be used to control the environment within a facility (e.g., building), and is one example of an industrial system that may be associated with the facility. For example, an HVAC system can include a number of components (e.g., equipment) that can be used to control the air temperature of different zones (e.g., rooms, areas, spaces, and/or floors) of a facility, in order to keep the zones in a comfort state for their occupants. As an additional example in which the facility is a retail facility, the HVAC equipment may be used to continuously operate (e.g., cool) commercial refrigerators and/or freezers.

During operation of an industrial system such as an HVAC system, however, faults in the system (e.g., in the equipment of the system) may sometimes occur. Detecting and correcting faults in the equipment of the system can be important to provide and maintain a comfortable environment for the occupants of the facility, to prevent the fault from causing further damage to the system, to prevent downtime in the equipment that may lead to significant loss, and/or to avoid inefficient operation of the system which may result in higher energy consumption, for example.

DETAILED DESCRIPTION

Figure 1:
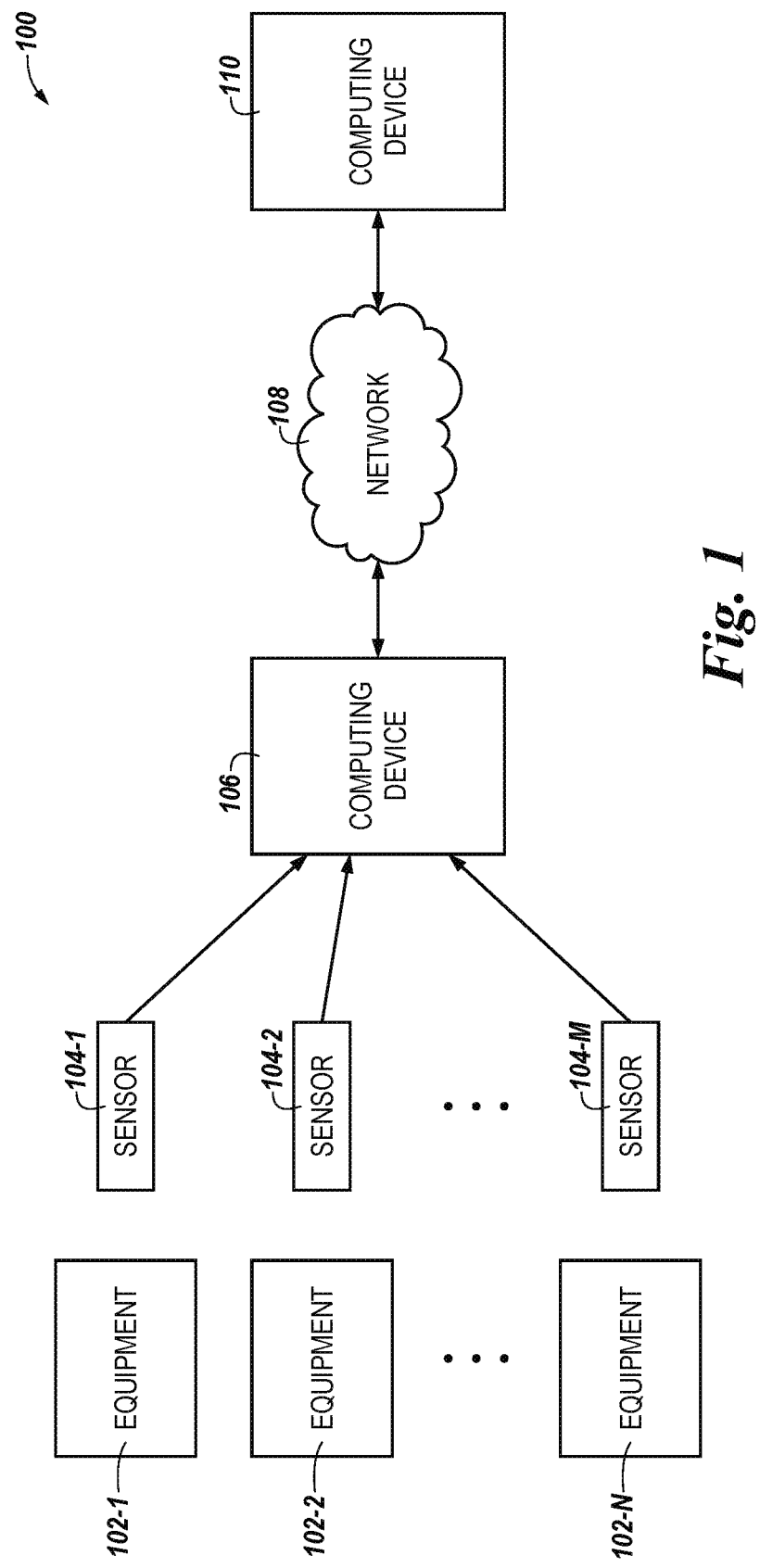
FIG. 1 illustrates an example of a system for monitoring industrial equipment using audio in accordance with an embodiment of the present disclosure.

Systems, methods, and devices for monitoring industrial equipment using audio are described herein. For example, an embodiment includes two computing devices. The first computing device can receive, from an audio sensor, audio sensed by the sensor during operation of industrial equipment, extract a plurality of features from the audio, determine whether any portion of the audio is anomalous, and send, upon determining a portion of the audio is anomalous, the anomalous portion of the audio to the second, remotely located, computing device. The second computing device can provide the anomalous portion of the audio to a user to determine whether the anomalous portion of the audio corresponds to a fault occurring in the equipment, and receive, from the user upon determining the anomalous portion of the audio corresponds to a fault occurring in the equipment, input indicating the anomalous portion of the audio corresponds to the fault to learn fault patterns in the equipment.

Previous approaches for monitoring industrial equipment, such as, for instance, equipment of an HVAC system, may use vibration sensors to detect faults occurring in the equipment. However, in order to effectively detect faults, such vibration sensors need to be in direct contact with (e.g., attached and/or mounted to) the equipment, which results in additional downtime being needed for calibration and/or repair of the sensors. Accordingly, such vibration sensors may be considered invasive sensors relative to the HVAC system. Further, such vibration sensors may only be usable with certain types of HVAC equipment (e.g., such vibration sensors may be equipment specific). Accordingly, such vibration sensors may not be considered agnostic relative to the equipment of the HVAC system.

In contrast, embodiments of the present disclosure may use audio sensors to detect faults occurring in industrial (e.g., HVAC) equipment. Such audio sensors may not need to be in direct contact with the equipment to effectively detect faults in the equipment, and therefore may be considered non-invasive sensors relative to the HVAC system. Further, such audio sensors may be usable with all types of industrial equipment (e.g., may not be equipment specific), and therefore may be considered agnostic relative to the equipment. Further, such audio sensors may be cheaper and/or easier to install than vibration sensors.

Further, previous approaches for monitoring industrial equipment to detect faults may be reactive. For instance, in previous approaches, any action needed to correct a fault may be taken only after the fault has been detected, which may result in unpredictable equipment downtime and/or manual effort by the technician to correct the fault. Further, the technician may only be able to assess and correct the fault upon a manual, on-site inspection, which increases the amount of time needed to correct the fault, and adversely affects the technician's productivity. Further, in some instances it may be difficult for the technician to assess and correct the fault quickly and/or accurately due to, for instance, a lack of knowledge and/or skill on the part of the technician.

In contrast, embodiments of the present disclosure may be able to proactively detect and correct faults occurring in industrial (e.g., HVAC) equipment. For instance, monitoring the equipment using audio may provide an early indication of a fault occurring in the equipment (e.g., before the fault causes a significant problem), such that the fault may be detected and/or corrected with minimal or no downtime in the equipment. Further, embodiments of the present disclosure may be able to automatically detect and/or correct a fault occurring in the equipment (e.g., the fault may be detected and/or corrected without a technician having to visit the site and manually inspect the equipment). Further, embodiments of the present disclosure may facilitate the learning of fault patterns over time via crowd sourcing for identification of anomalous audio, such that future faults can be accurately detected and corrected across multiple facilities in a quicker and more efficient manner. For instance, embodiments of the present disclosure may not have to be pre-configured; rather, embodiments can be taught to recognize unique patterns for the environment of the system. Further, embodiments of the present disclosure can self-learn the noise profile and/or characterization of the equipment upon deployment. Further, embodiments of the present disclosure can facilitate the capture and distribution of expert technician knowledge across similar equipment in different facilities.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things, while "a plurality of" something can refer to more than one such things. For example, "a number of faults" can refer to one or more faults, while "a plurality of faults" can refer to more than one fault. Additionally, the designators "N", "M", and "P", as used herein, particularly with respect to the reference numerals in the drawings, indicates that a number of the particular feature so designated can be included with a number of embodiments of the present disclosure.

FIG. 1 illustrates an example of a system 100 for monitoring industrial equipment using audio in accordance with an embodiment of the present disclosure. The industrial equipment can be, for example, the equipment of a heating, ventilation, and air conditioning (HVAC) system of a facility (e.g., building), such as, for instance, an office building (e.g., a commercial office building), or a retail facility (e.g., a retail facility having commercial refrigerators and/or freezers). However, embodiments of the present disclosure are not limited to a particular type of facility, or to a particular type of industrial equipment. For instance, embodiments of the present disclosure can be used in a process plant system, conveyor belt system, or any other type of industrial setting that generates noise that can be captured.

The HVAC system can be used to control the environment within the facility. For example, the HVAC system can include a number of components (e.g., equipment 102-1, 102-2, ..., 102-N illustrated in FIG. 1) that can be used to control the air temperature of different zones (e.g., rooms, areas, spaces, and/or floors) of the facility, in order to keep the zones in a comfort state for their occupants. As an additional example, the equipment of the HVAC system may be used to continuously operate (e.g., cool) commercial refrigerators and/or freezers of the facility.

The equipment of the HVAC system (e.g., equipment 102-1, 102-2, ..., 102-N) can include, for example, valves such as heating and/or cooling valves, chillers (e.g., chiller plant), boilers (e.g., boiler plant), pumps such as hot water and/or chilled water pumps, fans, compressors, air dampers such as variable air volume (VAV) dampers, air handling units (AHUs) (e.g., AHU plant), coils such as heating and/or cooling coils, air filters, and/or cooling towers, among other equipment. The HVAC system may also include connections (e.g., physical connections) between the equipment, such as a chain of equipment (e.g., duct work, pipes, ventilation, and/or electrical and/or gas distribution equipment) that connects the components of the HVAC system, among other connections.

As shown in FIG. 1, system 100 can include a number of audio sensors 104-1, 104-2, ..., 104-M located within the facility. Audio sensors 104-1, 104-2, ..., 104-M can be, for example, microphones. However, embodiments of the present disclosure are not limited to a particular type of audio sensor.

Audio sensors 104-1, 104-2, ..., 104-M can sense (e.g., collect and/or record) audio (e.g. noise) that occurs during (e.g., results from) the operation of HVAC equipment 102-1, 102-2, ..., 102-N. For instance, audio sensor 104-1 can sense the audio that occurs during the operation of equipment 102-1, audio sensor 104-2 can sense the audio that occurs during the operation of equipment 102-2, and audio sensor 104-M can sense the audio that occurs during the operation of equipment 102-N. However, embodiments of the present disclosure are not limited to such a one-to-one correspondence between the equipment and audio sensors (e.g., in some embodiments, one audio sensor may sense the audio that occurs during the operation of a plurality of equipment). Audio sensors 104-1, 104-2, ..., 104-M can sense the audio as audio clips (e.g., 10 second audio clips) continuously over a period of days, in order to encapsulate the typical operation noise profile for the equipment.

As an additional example, audio sensors 104-1, 104-2, ..., 104-M can sense audio that occurs during an event associated with the HVAC system. For instance, audio sensors 104-1, 104-2, ..., 104-M can sense audio during an event associated with (e.g., that occurs during) operation of HVAC equipment 102-1, 102-2, ..., 102-N. Examples of such events will be further described herein.

Audio sensors 104-1, 104-2, ..., 104-M may not be in direct contact with HVAC equipment 102-1, 102-2, ..., 102-N. For instance, audio sensors 104-1, 104-2, ..., 104-M may not be attached or mounted to equipment 102-1, 102-2, ..., 102-N. As such, audio sensors 104-1, 104-2, ..., 104-M may be non-invasive, equipment agnostic sensors.

As shown in FIG. 1, system 100 can include computing device 106. Computing device 106 can be located at (e.g., within) the facility. An example of such a computing device will be further described herein (e.g., in connection with FIG. 4). For instance, such a computing device can include a memory, a processor, and a user interface, as will be further described herein (e.g., in connection with FIG. 4).

As shown in FIG. 1, computing device 106 can receive the audio sensed by audio sensors 104-1, 104-2, ..., 104-M from the audio sensors. For instance, computing device 106 can receive the audio sensed by the audio sensors during the operation of HVAC equipment 102-1, 102-2, ..., 102-N, and determine whether any portion (e.g., clip) of the audio sensed during the operation of the equipment is anomalous. For instance, computing device 106 can determine whether any portion of the audio is an outlier from the normal operation of the equipment. Computing device 106 can make this determination in a continuous (e.g., 24/7), unsupervised manner (e.g., automatically, without using or needing user input at the facility). For instance, computing device 106 can establish the normal operational noise profile for the equipment to determine the boundaries of normal operation, which can then be used to automatically detect anomalous equipment noise. Further, computing device 106 can be an edge device that can perform the detection of the anomalous equipment noise using unsupervised machine learning as part of edge analytics.

For example, computing device 106 can determine whether any portion of the audio sensed by the audio sensors 104-1, 104-2, . . . , 104-M during the operation of the equipment 102-1, 102-2, . . . , 102-N is anomalous by comparing the sensed audio to the profile (e.g., signature and/or pattern) of the audio sensed by the audio sensors during normal operation of the equipment. A portion of the sensed audio may be determined to be anomalous upon the comparison indicating that portion of the audio deviates from the profile (e.g., is outside the boundaries of the profile) of the audio sensed during the normal operation of the equipment. Such a deviation can be flagged as an anomaly, and that anomalous portion (e.g., the corresponding audio clip) can be stored by computing device 106 (e.g., for future play back to a technician to prioritize and/or plan equipment inspection and/or maintenance).

Computing device 106 can generate (e.g. identify) the profile of the audio sensed by the audio sensors 104-1, 104-2, . . . , 104-M during the normal operation of the equipment 102-1, 102-2, . . . , 102-N by extracting a plurality of features from the audio sensed during the normal operation of the equipment, and combining the plurality of extracted features to determine the boundaries for the profile. The plurality of extracted features can include, for example, time-based features (e.g., time statistics) and/or frequency-based features (e.g., frequency statistics) of the audio sensed by the audio sensors during the normal operation of the equipment. For example, the audio sensors may capture the aggregate operational audio signature of the equipment using the plurality of features extracted from a wideband frequency range, which may reflect specific artifacts in the sensed audio. Based on this signature, computing device 106 can determine (e.g., learn) the boundaries for the normal operation of the equipment as a combination of the audio artifacts. In such a manner, computing device 106 can self-learn the noise profile of the equipment, in order to characterize the normal operational noise of the equipment in its deployed environment.

As shown in FIG. 1, system 100 can include an additional computing device 110. Computing device 110 can be located remotely from the facility (e.g., remotely from computing device 106). For instance, computing device 110 can be part of a centralized, cloud-based analytics service (e.g., servers and/or databases). An example of such a computing device will be further described herein (e.g., in connection with FIG. 4). For instance, such a computing device can include a memory, a processor, and a user interface, as will be further described herein (e.g., in connection with FIG. 4).

Upon determining a portion of the audio sensed by audio sensors 104-1, 104-2, . . . , 104-M is anomalous, computing device 106 can send (e.g., transmit) the anomalous portion of the audio to computing device 110 (e.g., computing device 110 can receive the anomalous portion of the audio from computing device 106). However, portions of the sensed audio not determined to be anomalous may not be sent to computing device 110 by computing device 106 (e.g., only anomalous audio portions may be sent to computing device 110 by computing device 106).

As shown in FIG. 1, computing device 106 can send the anomalous portion of the audio to computing device 110 via network 108 (e.g., computing device 110 can receive the anomalous portion of the audio from computing device 106 via network 108). Network 108 can be a wired or wireless network. For example, network 108 can be a network relationship through which computing devices 106 and 110 can communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive the anomalous audio portion from computing device 106, and transmit the anomalous audio portion to computing device 110 via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Computing device 110 can provide the received anomalous audio portion to a user (e.g., technician) to determine whether the anomalous audio portion corresponds to a fault occurring in the equipment. For example, computing device 110 can provide an alert to the user of the anomalous audio portion and play the anomalous audio portion for the user, who can listen to it and determine whether it corresponds to a fault occurring in the equipment. An example of such an alert will be further described herein (e.g., in connection with FIG. 3).

As used herein, a fault occurring in the equipment can include and/or refer to the equipment functioning improperly and/or causing abnormal behavior in the HVAC system and/or facility, and/or to an event that occurs to cause the equipment to function improperly or cause the abnormal behavior. For example, a fault in the equipment can include and/or refer to the equipment breaking down, malfunctioning, ceasing to operate correctly, or operating in an unexpected manner. As an additional example, a fault can include and/or refer to abnormal (e.g., anomalous) behavior of the equipment.

Upon the user determining the anomalous audio portion corresponds to a fault occurring in the equipment, computing device 110 can receive from the user an input indicating that the anomalous audio portion corresponds to the fault. For instance, the user may identify (e.g., label, annotate, and/or validate) the anomalous audio portion as corresponding to the fault. Further, the user may add comments and/or remarks about the fault in the form of text input.

As such, computing device 110 can learn that the anomalous audio portion corresponds to the fault (e.g., that particular type of fault) in a user (e.g., technician) supervised manner, and store the anomalous audio portion accordingly. For example, computing device 110 can use supervised machine learning to classify anomalous audio as faults, and build an audio corpus (e.g., database of audio files) for different classes of faults. This process can be referred to herein as "training mode".

Computing device 110 can then use this knowledge to detect (e.g., in an unsupervised manner) subsequent faults that may occur in HVAC equipment 102-1, 102-2, . . . , 102-N. As such, computing device 110 can learn fault patterns in the equipment over time via crowd sourcing for identification of anomalous audio, such that computing device 110 can accurately detect subsequent (e.g., future) faults in the equipment in a quicker and more efficient manner, without having to be pre-configured. This process can be referred to herein as "test mode".

For example, during subsequent operation of HVAC equipment 102-1, 102-2, . . . , 102-N, audio sensors 104-1, 104-2, . . . , 104-M can sense the audio that occurs, and send this additional audio to computing device 106 (e.g., computing device 106 can receive the additional audio from the audio sensors). Computing device 106 can then determine whether any portion of this additional audio is anomalous, in a manner analogous to that previously described herein for the previously sensed audio. Upon determining a portion of the additional audio is anomalous, computing device 106 can send the anomalous portion of the additional audio to computing device 110 (e.g., computing device 110 can receive the anomalous portion of the additional audio from computing device 106) in a manner analogous to that previously described herein for the previously sensed audio.

Computing device 110 can then determine whether the anomalous portion of the additional audio corresponds to a fault occurring in the equipment based, at least in part, on the input previously received from the user (e.g., the input indicating the previous anomalous audio portion corresponded to a fault). For example, computing device 110 can compare the anomalous portion of the additional audio (e.g., the profile of the additional anomalous portion of the additional audio) to the previous anomalous audio portion (e.g., to the profile of the previous anomalous audio portion) indicated by the user to correspond to a fault to determine whether the anomalous portion of the additional audio matches the previous anomalous audio portion. If the comparison indicates a match, computing device 110 can determine that that the anomalous portion of the additional audio corresponds to a fault (e.g., the same type of fault that the previous anomalous audio portion corresponded to).

Upon determining the anomalous portion of the additional audio corresponds to the fault (e.g., if the comparison indicates a match), computing device 110 can provide an alert to the user of computing device 110 indicating the fault is occurring. If, however, the comparison does not indicate a match (e.g., thereby indicating that the anomalous portion of the additional audio does not correspond to the same type of fault that the previous anomalous audio portion corresponded to), computing device 110 can provide the anomalous portion of the additional audio to the user to determine whether the anomalous portion of the additional audio corresponds to a fault (e.g., a different type of fault) occurring in the equipment, in a manner analogous to that previously described herein for the previous anomalous audio portion.

Upon the user determining the anomalous portion of the additional audio corresponds to a fault occurring in the equipment, computing device 110 can receive from the user an input indicating that the anomalous portion of the additional audio corresponds to the fault, in a manner analogous to that previously described herein for the previous fault. As such, computing device 110 can learn that the anomalous portion of the additional audio corresponds to the fault, and also store this anomalous audio portion accordingly. Computing device 110 can then use this additional knowledge in an analogous manner to detect subsequent faults that may occur in HVAC equipment 102-1, 102-2, . . . , 102-N. This process can continue to be performed throughout the operation of HVAC equipment 102-1, 102-2, . . . , 102-N, such that computing device 110 can continue to learn and detect additional faults (e.g., additional types of faults) during the operation of the equipment in a proactive manner (e.g., such that computing device 110 can continue to learn fault patterns in the equipment over time via crowd sourcing for identification of anomalous audio, such that computing device 110 can continue to accurately detect future faults in the equipment in a quicker and more efficient manner, without having to be pre-configured).

As an additional example, computing device 106 can receive the audio sensed by audio sensors 104-1, 104-2, . . . , 104-M during an event associated with (e.g., that occurs during) the operation of HVAC equipment 102-1, 102-2, . . . , 102-N, and send, via network 108, this audio to computing device 110. Computing device 110 can provide this audio to a user (e.g., technician) to determine whether the event corresponds to a fault occurring in equipment 102-1, 102-2, . . . , 102-N. For example, computing device 110 can provide an alert of the event to the user and play the audio sensed during the event for the user, who can listen to it and determine (e.g., based on the user's expert knowledge) whether it corresponds to a fault occurring in the equipment.

Upon the user (e.g., technician) determining the event corresponds to a fault occurring in the equipment, computing device 110 can receive from the user an input indicating that the audio sensed during the event corresponds to the fault. For instance, the user may identify (e.g., annotate) the audio sensed during the event as corresponding to the fault, and store this identified audio (e.g., the profile of the audio) accordingly.

As such, computing device 110 can learn audio that corresponds to a fault (e.g., a particular type of fault) in a user (e.g., technician) supervised manner. That is, computing device 110 can capture the technician's expert knowledge in determining whether noise in the audible range corresponds to a fault. For example, computing device 110 can use supervised machine learning to classify audio as faults, and build an audio corpus (e.g., database of audio files) for different classes of faults.

Computing device 110 can then use this knowledge to detect (e.g., in an unsupervised manner) subsequent faults that may occur in HVAC equipment 102-1, 102-2, . . . , 102-N. Further, computing device 110 can use this knowledge to detect faults that may occur in similar equipment in different facilities, as will be further described herein. That is, computing device 110 can distribute the technician's expert knowledge across similar equipment in different facilities. As such, computing device 110 can learn fault patterns in the equipment over time via crowd sourcing for identification of anomalous audio, such that computing device 110 can accurately detect subsequent (e.g., future) faults in the equipment in a quicker and more efficient manner, without having to be pre-configured.

For example, audio sensors 104-1, 104-2, . . . , 104-M can sense the audio that occurs during an additional (e.g., subsequent) event associated with the operation of HVAC equipment 102-1, 102-2, . . . , 102-N, and send this additional audio to computing device 106 (e.g., computing device 106 can receive this additional audio from the audio sensors). Computing device 106 can then send, via network 108, this additional audio to computing device 110.

Computing device 110 can then determine whether the additional event corresponds to a fault occurring in the equipment based, at least in part, on the input previously received from the user (e.g., the input indicating the audio sensed during the previous event corresponded to a fault). For example, computing device 110 can compare the audio sensed during the additional event (e.g., the profile of the audio sensed during the additional event) to the audio (e.g., to the profile of the audio, stored by computing device 110) previously indicated by the user as corresponding to a fault to determine whether the audio (e.g., the profile of the audio) sensed during the additional event matches the audio (e.g., the profile of the audio) previously indicated as corresponding to the fault. If the comparison indicates a match, computing device 110 can determine that that the additional event corresponds to a fault (e.g., the same type of fault that the previous event corresponded to).

Upon determining the additional event corresponds to the fault (e.g., upon the comparison indicating a match), computing device 110 can provide an alert to the user of computing device 110 indicating the fault is occurring and that the equipment may need servicing. If, however, the comparison does not indicate a match (e.g., thereby indicating that the additional event does not correspond to the same type of fault that the previous event corresponded to), computing device 110 can provide the audio sensed during the additional event to the user to determine whether the additional event corresponds to a fault (e.g., a different type of fault) occurring in the equipment, in a manner analogous to that previously described herein for the audio sensed during the previous event.

Upon the user determining the additional event corresponds to a fault occurring in the equipment, computing device 110 can receive from the user an input indicating that the additional event corresponds to the fault, in a manner analogous to that previously described herein for the previous event. As such, computing device 110 can learn that the additional event corresponds to the fault, and store the audio sensed during the additional event accordingly. Computing device 110 can then use this additional knowledge in an analogous manner to detect subsequent faults that may occur in HVAC equipment 102-1, 102-2, . . . , 102-N. This process can continue to be performed throughout the operation of HVAC equipment 102-1, 102-2, . . . , 102-N, such that computing device 110 can continue to learn and detect additional faults (e.g., additional types of faults) during the operation of the equipment in a proactive manner (e.g., such that computing device 110 can continue to learn fault patterns in the equipment over time via crowd sourcing for anomalous audio, such that computing device 110 can continue to accurately detect future faults in the equipment in a quicker and more efficient manner, without having to be pre-configured).

Further, this process can be used to learn and detect faults (e.g., fault patterns) that occur in the equipment of different HVAC equipment across multiple facilities via crowd sourcing for identification of anomalous audio, such that computing device 110 can accurately detect faults across multiple facilities without having to be pre-configured. For example, although not shown in FIG. 1 for simplicity and not to obscure embodiments of the present disclosure, system 100 may include additional audio sensors located within an additional facility that can sense audio that occurs during an event associated with the operation of the equipment of the HVAC system of that facility. System 100 may also include an additional computing device located at the additional facility that can receive the audio sensed by the additional audio sensors, and send, via network 108, this audio to computing device 110.

Computing device 110 can then determine whether the event associated with the HVAC equipment of the additional facility corresponds to a fault occurring in the equipment based, at least in part, on the input previously received from the user (e.g., the input indicating the audio sensed during the event(s) associated with the operation of HVAC equipment 102-1, 102-2, . . . , 102-N corresponded to a fault(s)). For example, computing device 110 can compare the audio (e.g., the profile of the audio) sensed during the event associated with the HVAC equipment of the additional facility to the audio (e.g., to the profile of the audio, stored by computing device 110) sensed during the event(s) associated with the operation of HVAC equipment 102-1, 102-2, . . . , 102-N previously indicated by the user as corresponding to a fault(s) to determine whether the audio sensed during the event associated with the HVAC equipment of the additional facility matches the audio sensed during the event(s) associated with the operation of HVAC equipment 102-1, 102-2, . . . , 102-N previously indicated as corresponding to the fault(s). If the comparison indicates a match, computing device 110 can determine that that the event associated with the HVAC equipment of the additional facility corresponds to the matching fault.

Upon determining the event associated with the HVAC equipment of the additional facility corresponds to a fault (e.g., upon the comparison indicating a match), computing device 110 can provide an alert to the user of computing device 110 indicating the fault is occurring and that the equipment may need servicing. If, however, the comparison does not indicate a match (e.g., thereby indicating that the event associated with the HVAC equipment of the additional facility does not correspond to the same type(s) of fault(s) that the event(s) associated with the operation of HVAC equipment 102-1, 102-2, . . . , 102-N corresponded to), computing device 110 can provide the audio sensed during the event associated with the HVAC equipment of the additional facility to the user to determine whether that event corresponds to a fault (e.g., a different type of fault) occurring in the equipment, in a manner analogous to that previously described herein. Upon the user determining that event corresponds to a fault occurring in the equipment of the addition facility, computing device 110 can receive from the user an input indicating that event corresponds to the fault, in a manner analogous to that previously described herein for the previous event. As such, computing device 110 can use this knowledge to detect subsequent faults that may occur in HVAC equipment across multiple facilities (e.g., environments).

As an additional example, computing device 106 can receive the audio sensed by audio sensors 104-1, 104-2, . . . , 104-M during an event associated with the HVAC system of the facility. The event may be, for instance, a safety, security, or maintenance event associated with the HVAC system, including the command and control of the HVAC system (e.g., of HVAC equipment 102-1, 102-2, . . . , 102-N) during normal operation, observation of a mandatory safety procedure during operation of the HVAC system, a performance degradation check of the HVAC system, performance of repair work on the HVAC system, performance of upgrades on the HVAC system, calibration of the HVAC system, a security breach, or an occurrence of a safety violation, among others. The audio may include, for instance, voice commands, questions, and/or observations spoken by, and/or interactions between, individuals associated with (e.g., involved in) the event.

Computing device 106 can identify the event based, at least in part, on the audio sensed by the audio sensors during the event, and send, via network 108, the identification of the event to computing device 110 (e.g., computing device 110 can receive the identification of the event from computing device 106 via network 108). For instance, computing device 106 can categorize and localize the source of the audio to determine which type of event the audio is relevant to. Further, computing device 106 can distinguish between audio generated by the HVAC equipment and human-generated audio to identify the event.

Computing device 110 can then initiate a response to the event based, at least in part, on the identification of the event. For instance, computing device 110 can determine actions for the HVAC system (e.g., the control system of the HVAC system) to take in response to the identified event, and automatically instruct (e.g., trigger) the HVAC system to take the determined actions, or provide (e.g., recommend) the determined actions to the user (e.g., technician) of computing device 110.

As such, computing devices 106 and 110 can learn audio that corresponds to an event (e.g., a particular type of event), and the appropriate response to that event (e.g., to that type of event). Computing devices 106 and 110 can then use this knowledge (e.g., self-calibrate) to identify and respond to (e.g., in an unsupervised manner) subsequent events associated with the HVAC system.

For example, audio sensors 104-1, 104-2, . . . , 104-M can sense the audio that occurs during an additional (e.g., subsequent) event associated with the HVAC system, and send this additional audio to computing device 106 (e.g., computing device 106 can receive this additional audio from the audio sensors). Computing device 106 can identify the additional event based, at least in part, on the audio sensed by the audio sensors during the additional event and the identification of the previous event.

For example, computing device 106 can compare the audio (e.g., the profile of the audio) sensed during the additional event associated with the HVAC system to the audio (e.g., to the profile of the audio) sensed during the previous event associated with the HVAC system previously identified by computing device 106 to determine whether the audio sensed during the additional event matches the audio sensed during the previous event identified by computing device 106. If the comparison indicates a match, computing device 106 can determine that that the additional event associated with the HVAC system corresponds to the same type of event as the previously identified event, and identify the additional event accordingly. If the comparison does not indicate a match, the additional event may correspond to a different type of event, and computing device 106 can identify the additional event accordingly.

Computing device 106 can then send, via network 108, the identification of the additional event to computing device 110 (e.g., computing device 110 can receive the identification of the additional event from computing device 106 via network 108). Computing device 110 can then initiate a response to the event based, at least in part, on the identification of the additional event and the response initiated to the previously identified event. For example, if the identification of the additional event indicates that the additional event is the same type of event as the previously identified event, computing device 110 can initiate the same response that was initiated for the previously identified event; if the identification of the additional event indicates that the additional event is a different type of event than the previously identified event, computing device 110 can initiate a response for that different type of event. This process can continue to be performed throughout the operation of the HVAC system, such that computing devices 106 and 110 can continue to identify and respond to subsequent events associated with the HVAC system in a proactive manner.

Figure 2:
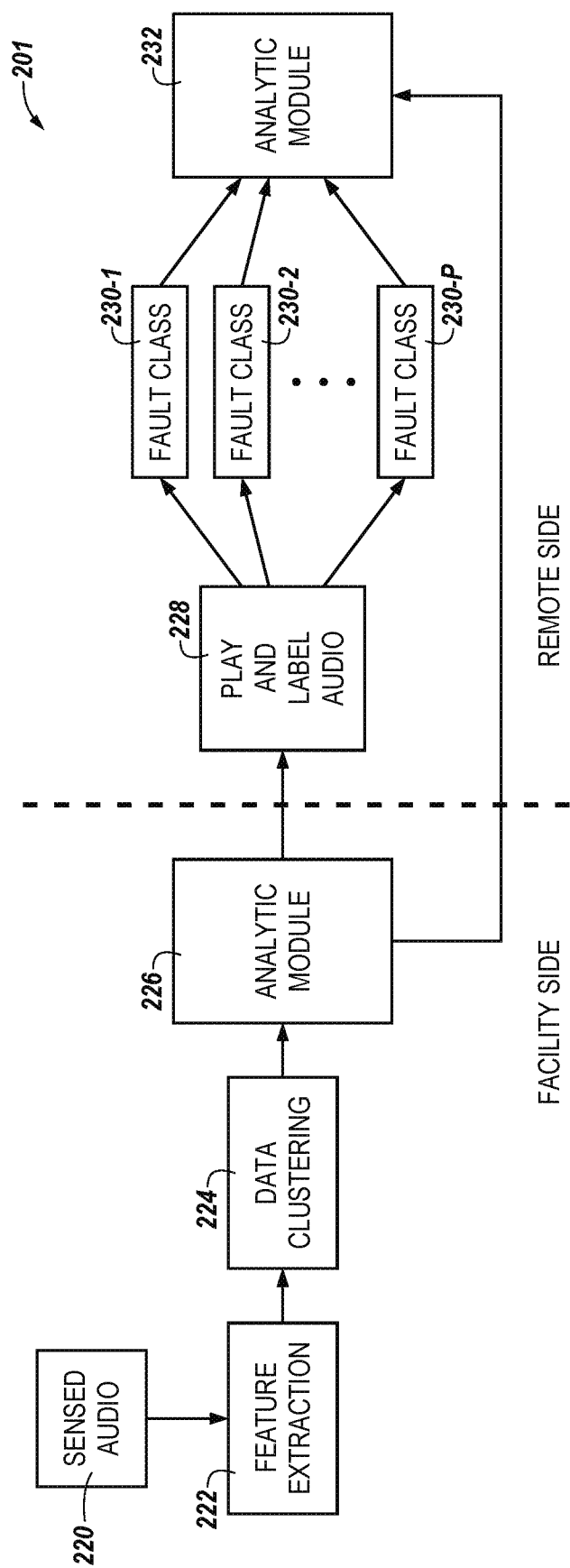
FIG. 2 illustrates a conceptual example of a method for monitoring industrial equipment using audio in accordance with an embodiment of the present disclosure.

FIG. 2 illustrates a conceptual example of a method 201 for monitoring industrial (e.g., HVAC) equipment using audio in accordance with an embodiment of the present disclosure. Method 201 can be performed by, for example, system 100 previously described in connection with FIG. 1. For example, the portion of method 201 shown on the facility side of FIG. 2 can be performed by computing device 106 previously described in connection with FIG. 1, and the portion of method 201 shown on the remote side of FIG. 2 can be performed by computing device 110 previously described in connection with FIG. 1.

As shown in FIG. 2, sensed (e.g., raw) audio can be received at block 220. The sensed audio can be received, for example, from audio sensors 104-1, 104-2, . . . , 104-M previously described in connection with FIG. 1 (e.g., the sensed audio can be analogous to the sensed audio previously described in connection with FIG. 1).

As shown in FIG. 2, a plurality of features can be extracted from the sensed audio at block 222, and the data associated with the extracted features can be clustered at block 224. The extracted features, and the manner in which the features are extracted, can be analogous to that previously described in connection with FIG. 1.

At block 226, an analytic module (e.g, an unsupervised analytic module) can determine whether any portion of the sensed audio is anomalous. This determination can be made in a manner analogous to that previously described in connection with FIG. 1. For instance, anomalous audio can be detected using unsupervised (e.g., automatic) machine learning as part of edge analytics, as previously described in connection with FIG. 1. As used herein, a "module" can include computer readable instructions that can be executed by a processing resource (e.g., processor) to perform a particular function. A module can also include hardware, firmware, and/or logic that can perform a particular function.

Upon a portion of the sensed audio being determined to be anomalous, that portion of audio can be sent from the facility side of method 201 (e.g., from computing device 106) to the remote side of method 201 (e.g., to computing device 110), in a manner analogous to that previously described in connection with FIG. 1 (e.g., via network 108). It can then be determined, on the remote side of method 201, whether the anomalous portion of the audio corresponds to a fault using either training mode or test mode, as previously described herein in connection with FIG. 1.

For example, in training mode, the anomalous portion of the audio can be played to a user at block 228 to determine whether the anomalous audio portion corresponds to a fault, as previously described in connection with FIG. 1. Upon the user determining the anomalous audio portion corresponds to a fault, the user may label the anomalous audio portion as corresponding to the fault. For example, the user may classify the fault as belonging to one of fault classes 230-1, 230-2, . . . , 230-P, as shown in FIG. 1. The labelled (e.g. classified) anomalous audio portion may then be stored at block 232 by an analytic module (e.g., a supervised analytic module) for use in detecting subsequent faults that may occur during test mode. In such a manner, supervised machine learning can be used to classify anomalous audio as faults, and build an audio corpus (e.g., database of audio files) for different classes of faults.

During training mode, the anomalous portion of the audio can be input into the analytic module at block 232 to determine whether the anomalous audio portion corresponds to a fault. For example, the analytic module can compare the anomalous portion of the audio to previous audio portions determined to be (e.g., labelled as) anomalous by the user at block 228, in a manner analogous to that previously described in connection with FIG. 1.

Figure 3:
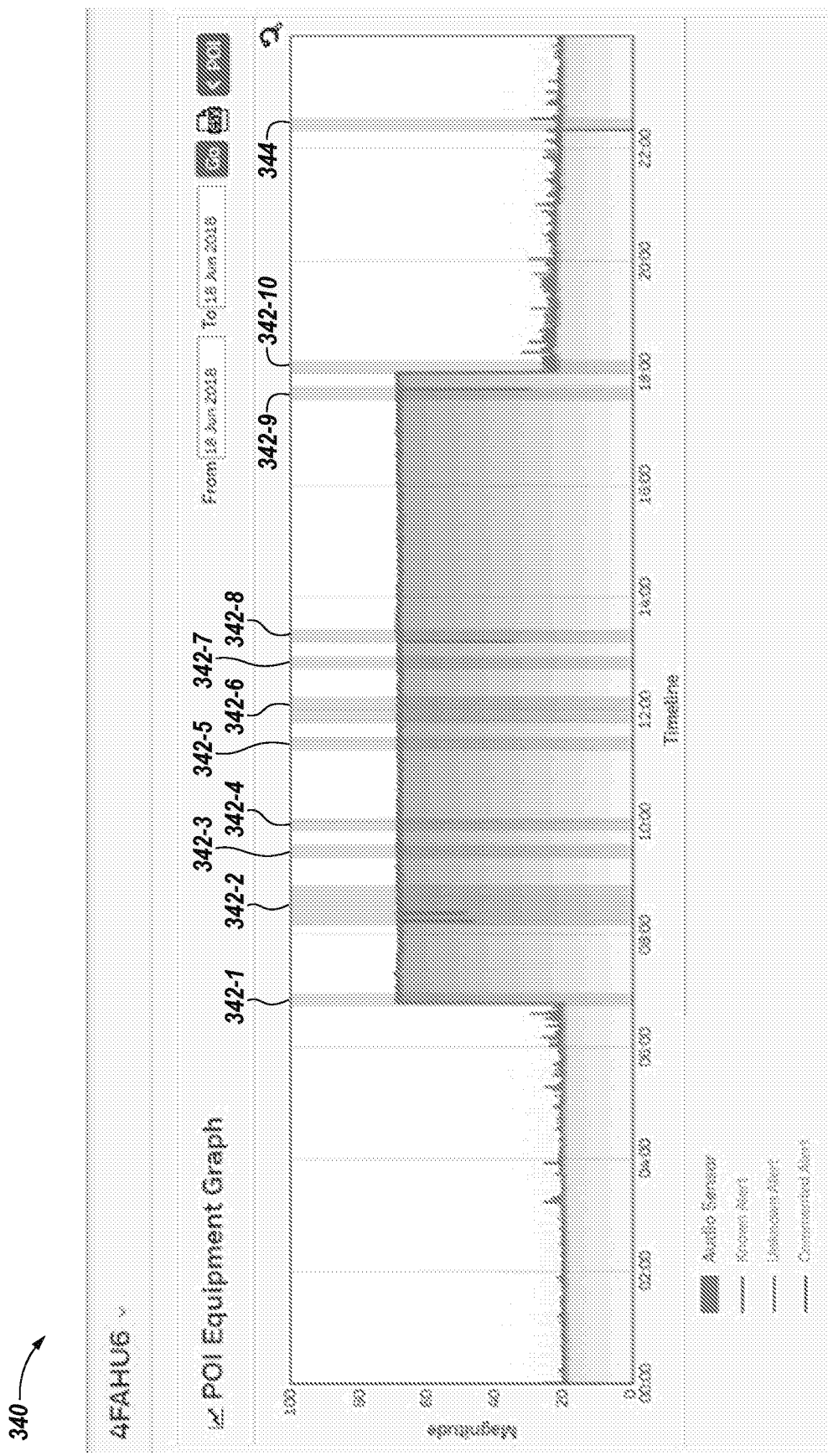
FIG. 3 illustrates an example display of an alert of an anomalous audio portion provided to a user in accordance with an embodiment of the present disclosure.

FIG. 3 illustrates an example display (e.g., a screen shot) 340 of alerts 342-1 through 342-10 (collectively referred to herein as alerts 342) and alert 344 of anomalous audio portions provided (e.g., displayed) to a user (e.g., technician) in accordance with an embodiment of the present disclosure. The display can be provided to the user by, for example, computing device 110 previously described in connection with FIG. 1.

As shown in FIG. 3, display 340 includes a graphical representation (e.g., timeline) of the magnitude of the audio sensed during the operation of equipment (e.g., an AHU) of an HVAC system of a facility throughout a particular day. As shown in FIG. 3, the graphical representation includes alerts 342 and 344 that each correspond to the occurrence of a different anomalous portion of the audio (e.g., to the time when each respective anomalous portion of the audio was sensed). For instance, alert 342-1 corresponds to an anomalous portion of the audio sensed around 6:45, alert 342-2 corresponds to an anomalous portion of the audio sensed around 8:30, etc.

In the example illustrated in FIG. 3, alerts 342 are known alerts. For instance, the anomalous portions of audio that correspond to alerts 342 correspond to (e.g., match) the audio of previously identified faults, as previously described herein. Further, in the example illustrated in FIG. 3, alert 344 is an unknown alert. For instance, the anomalous portion of audio that corresponds to alert 344 does not correspond to (e.g., does not match) the audio of any previously identified faults, as previously described herein.

Further, although not shown in FIG. 3 for clarity and so as not to obscure embodiments of the present disclosure, display 340 can include a mechanism (e.g., a playback feature) for the user to listen to the anomalous portion of the audio. Display 340 may also include a mechanism (e.g., selectable buttons) for the user to identify (e.g., select) whether the anomalous portion of the audio corresponds to a fault or a false alarm, and a mechanism (e.g., text input field) for the user to add comments and/or remarks about the fault.

Figure 4:
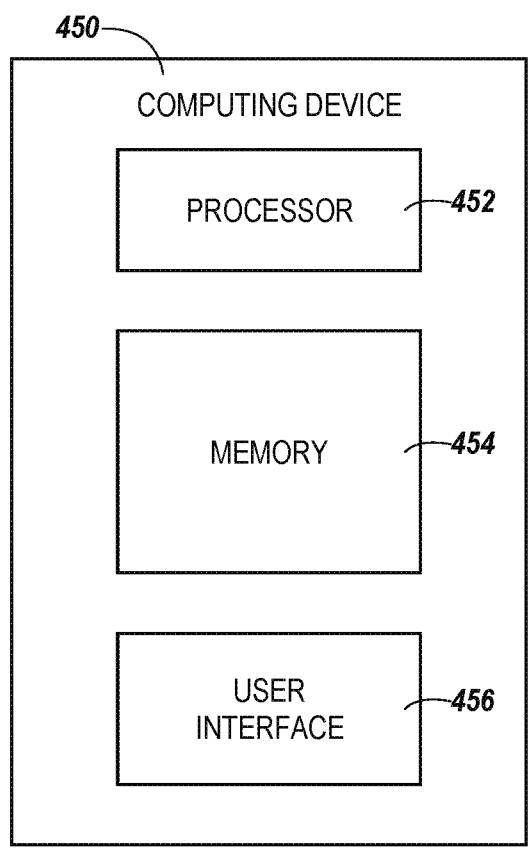
FIG. 4 illustrates an example of a computing device for monitoring industrial equipment using audio in accordance with an embodiment of the present disclosure.

FIG. 4 illustrates an example of a computing device 450 for monitoring industrial (e.g., HVAC) equipment using audio in accordance with an embodiment of the present disclosure. Computing device 450 can be an example of, for instance, computing devices 106 and 110 previously described in connection with FIG. 1.

Computing device 450 can be, for example, a laptop computer, a desktop computer, or a mobile device (e.g., smart phone, tablet, PDA, etc.). However, embodiments of the present disclosure are not limited to a particular type of computing device.

As shown in FIG. 4, computing device 450 can include a processor 452 and a memory 454. Memory 454 can be any type of storage medium that can be accessed by processor 452 to perform various examples of the present disclosure. For example, memory 454 can be a non-transitory computer readable medium having computer readable instructions (e.g., computer program instructions) stored thereon that are executable by processor 454 to monitor equipment of HVAC system using audio in accordance with the present disclosure. That is, processor 452 can execute the executable instructions stored in memory 454 to monitor equipment of an HVAC system using audio in accordance with the present disclosure.

Memory 454 can be volatile or nonvolatile memory. Memory 454 can also be removable (e.g., portable) memory, or non-removable (e.g., internal) memory. For example, memory 454 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 454 is illustrated as being located in computing device 450, embodiments of the present disclosure are not so limited. For example, memory 454 can also be located internal to another computing resource (e.g., enabling computer readable instructions to be downloaded over the Internet or another wired or wireless connection).

As shown in FIG. 4, computing device 450 can include a user interface 456. A user (e.g., operator) of computing device 450, such as, for instance, a technician of an HVAC system, can interact with computing device 450 via user interface 456. For example, user interface 456 can provide (e.g., display) information to and/or receive information from (e.g., input by) the user of computing device 450.

In some embodiments, user interface 456 can be a graphical user interface (GUI) that can include a display (e.g., a screen) that can provide and/or receive information to and/or from the user of computing device 450. The display can be, for instance, a touch-screen (e.g., the GUI can include touch-screen capabilities). As an additional example, user interface 456 can include a keyboard and/or mouse the user can use to input information into computing device 460, and/or a speaker that can play audio to the user. Embodiments of the present disclosure, however, are not limited to a particular type(s) of user interface.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for monitoring industrial equipment in a facility, comprising:
   receiving, from an audio sensor, an audio stream sensed by the audio sensor of an operation of industrial equipment in the facility;
   sending at least part of the audio stream to a trained machine learning module, wherein the trained machine learning module comprises an audio corpus of different classifications including at least one fault classification, and compares characteristics of at least part of the audio stream to the audio corpus of different classifications to identify one or more matching classifications, if any, the trained machine learning module is further configured to identify that the audio stream is indicative of a fault in the industrial equipment when the trained machine learning module identifies one or more matching classifications that also correspond to one or more of the fault classifications; and
   providing an alert to a user when the machine learning module determines that the audio stream is indicative of a fault in the industrial equipment.

2. The method of claim 1, wherein the machine learning module has a training mode and a test mode.

3. The method of claim 1, wherein at least one of the different classifications corresponds to a non-fault classification.

4. The method of claim 1, wherein when one or more matching classifications are not identified, sending the audio stream for classification, and then incorporating the audio stream and the resulting classification to the audio corpus.

5. The method of claim 1, wherein the alert identifies the one or more matching fault classifications that correspond to one or more of the fault classifications.

6. The method of claim 1, wherein the audio corpus of different classifications comprises a database of audio files obtained from industrial equipment located in a plurality of different facilities.

7. A method for monitoring industrial equipment in a facility, comprising:
   receiving, from an audio sensor, an audio stream sensed by the audio sensor of an operation of industrial equipment in the facility;
   sending at least part of the audio stream to a machine learning module;
   the machine learning module comparing the received audio stream to an audio corpus to attempt to classify the audio stream into at least one of a plurality of different classifications including at least one fault classification;
   when the audio stream is classified by the machine learning module into at least one fault classification, provide an alert to a user; and
   when the audio stream cannot be classified by the machine learning module:
      receiving a classification of the audio stream; and
      adding at least one or more characteristics of the audio stream and the resulting classification to the audio corpus.

8. The method of claim 7, wherein at least one of the plurality of different classifications corresponds to a non-fault classification.

9. The method of claim 7, wherein the alert identifies the fault classification in the alert.

10. The method of claim 7, wherein the audio corpus comprises a database of audio files obtained from industrial equipment located in a plurality of different facilities.

11. A method for monitoring industrial equipment in a facility, the method comprising:
    receiving, from an audio sensor, an audio stream sensed by the audio sensor of an operation of industrial equipment in the facility;
    sending at least part of the audio stream to a machine learning module, wherein the machine learning module accesses an audio corpus that includes a database of audio files obtained from industrial equipment, wherein each of the audio files is classified into one or more of a plurality of classifications;
    the machine learning module comparing at least part of the audio stream to the audio corpus to identify one or more matching classifications, if any; and
    when a matching classification is identified by the machine learning module, and when the matching classification is a fault classification, providing an alert to notify a user of a possible fault in the industrial equipment.

12. The method of claim 11, wherein:
    when a matching classification is not identified by the machine learning module, receiving a classification of the audio stream, and then adding at least one or more characteristics of the audio stream and the resulting classification to the audio corpus.

13. The method of claim 11, wherein the database of audio files includes auto files that are obtained from industrial equipment located in a plurality of different facilities, and wherein the machine learning module is hosted on a cloud based service.

14. The method of claim 13, further comprising:
    processing the audio stream sensed by the audio sensor to determine an anomalous portion of the audio stream; and
    wherein the at least part of the audio stream that is sent to the machine learning module includes at least part of the audio stream that is determined to be anomalous, and wherein at least part of the audio stream that is not determined to be anomalous is not sent to the machine learning module.

15. The method of claim 14, wherein the audio stream is processed to determine the anomalous portion of the audio stream via a controller located in the facility.

* * * * *